United States Patent [19]

Chao

[11] Patent Number: 5,278,811
[45] Date of Patent: Jan. 11, 1994

[54] MAGNETO-OPTIC RECORDING AND PLAYBACK SYSTEM

[75] Inventor: Zu-Wen Chao, Hsinchu, Taiwan

[73] Assignee: Industrial Technology Research Institute, Taiwan

[21] Appl. No.: 909,778

[22] Filed: Jul. 7, 1992

[51] Int. Cl.$^5$ ............................................. G11B 11/00
[52] U.S. Cl. ....................................... 369/18; 369/32; 369/13
[58] Field of Search ............. 369/18, 32, 44.14, 44.23, 369/44.24, 13, 59, 110, 44.15, 44.17, 44.22, 44.12; 360/59, 114

[56] References Cited

U.S. PATENT DOCUMENTS

| | | | |
|---|---|---|---|
| 4,519,056 | 5/1985 | Kimoto et al. | 369/32 X |
| 4,656,348 | 4/1987 | Ando | 369/44.24 X |
| 4,774,698 | 9/1988 | Henmi et al. | 369/13 |
| 5,070,494 | 12/1991 | Emoto et al. | 369/13 X |
| 5,073,888 | 12/1991 | Takahashi et al. | 369/13 X |

*Primary Examiner*—Robert J. Pascal
*Assistant Examiner*—Ali Neyzari
*Attorney, Agent, or Firm*—Ladas & Parry

[57] ABSTRACT

A magneto-optic reading apparatus includes a laser light source for generating a linearly polarized light beam and a quarter-wave plate which converts the linearly polarized light beam into a circularly polarized light beam. A beam splitter separates the circularly polarized light beam into a first beam which passes therethrough and a second beam which is reflected. An objective lens converges the first beam so as to scan one of the data tracks of a magneto-optic recording element. The information written along the scanned data track causes the polarization of the first beam to be modulated as the first beam is reflected by the recording element toward the first beam splitter. The first beam splitter further separates the first beam into a third beam which passes therethrough and a fourth beam which is reflected. The quarter-wave plate converts the third beam into a linearly polarized light beam which has a polarization that is substantially transverse to the polarization of the light beam from the laser light source. A polarizing beam splitter prevents the third beam from reaching the laser light source. An optical signal detecting system receives the fourth beam from the first beam splitter and generates a magnetization signal corresponding to the information along the scanned data track.

3 Claims, 3 Drawing Sheets

MAGNETO-OPTIC RECORDING AND PLAYBACK SYSTEM

BACKGROUND OF THE INVENTION

1. Field of the Invention

The invention relates to the field of magneto-optic recording. More particularly, it relates to improvements in a magneto-optic recording and playback system.

2. Description of the Related Art

A conventional magneto-optic recording and playback system (such as a magneto-optic disk drive system) basically comprises a magneto-optic disk, a magnetic head unit and an optical read/write head unit.

Digital signals can be erased, recorded and read from a magneto-optic disk. The magneto-optic disk can therefore be used as a peripheral memory device of a computer system. The magneto-optic disk is usually made of a magnetic material (such as TbFe).

Figure 1:
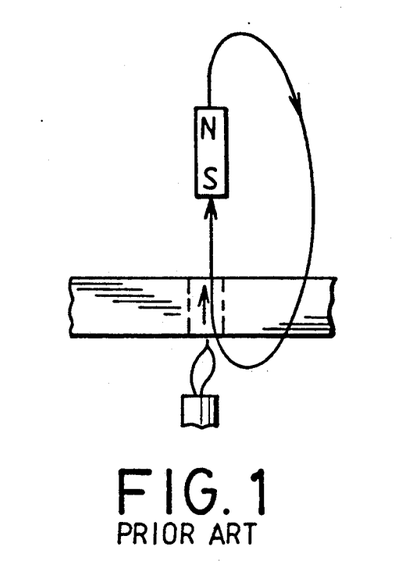
FIG. 1 illustrates how recording of binary data in a magneto-optic disk is accomplished.

Referring to FIG. 1, when erasing and/or recording data onto the magneto-optic disk, a predetermined region on the disk is heated to a temperature above the Curie temperature (usually at 200° C.). A sharp change in the magnetic characteristics at the heated region then occurs. The heated region is now in an erasable state. The binary data to be recorded on the disk is received by the magnetic head unit. The magnetic head unit generates a magnetic field which is perpendicular to the heated region. The direction of the magnetic field generated by the magnetic head unit depends upon the logic state of the binary data which is received by the same. The direction of magnetization at the heated region aligns with the direction of the applied magnetic field at this stage. When the temperature at the heated region drops below the Curie temperature, the heated region remains magnetized in the direction of the magnetic field which was applied thereto. This illustrates how information is recorded on a magneto-optic disk.

Figure 2:
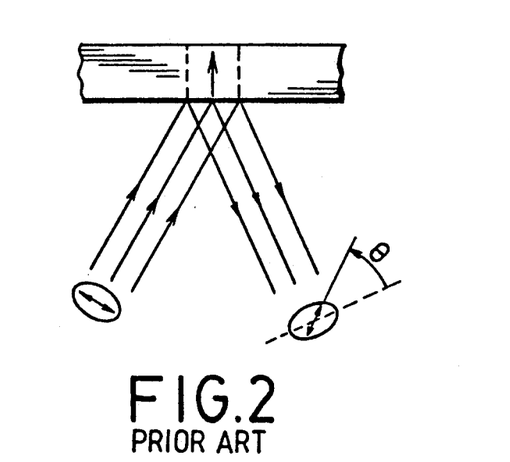
FIG. 2 illustrates how reading of pre-recorded binary data in a magneto-optic disk is accomplished.

Referring to FIG. 2, when reading information which is stored in a magneto-optic disk, the optical head unit generates a light beam which scans a data track of the disk. The light beam is reflected by the disk and has an angle of polarization which is altered, depending upon the direction of magnetization at the scanned data track. This change in the polarization is known as the Kerr angle.

If the scanned data track was upwardly magnetized (indicating that a binary "1" signal was recorded thereon), the Kerr angle is equal to $+\theta$, and if the scanned data track was downwardly magnetized (indicating that a binary "0" signal was recorded thereon), the Kerr angle is equal to $-\theta$. The logic state of the recorded information can therefore be determined by simply measuring the Kerr angle or the change in the polarization of the reflected beam.

Figure 3:
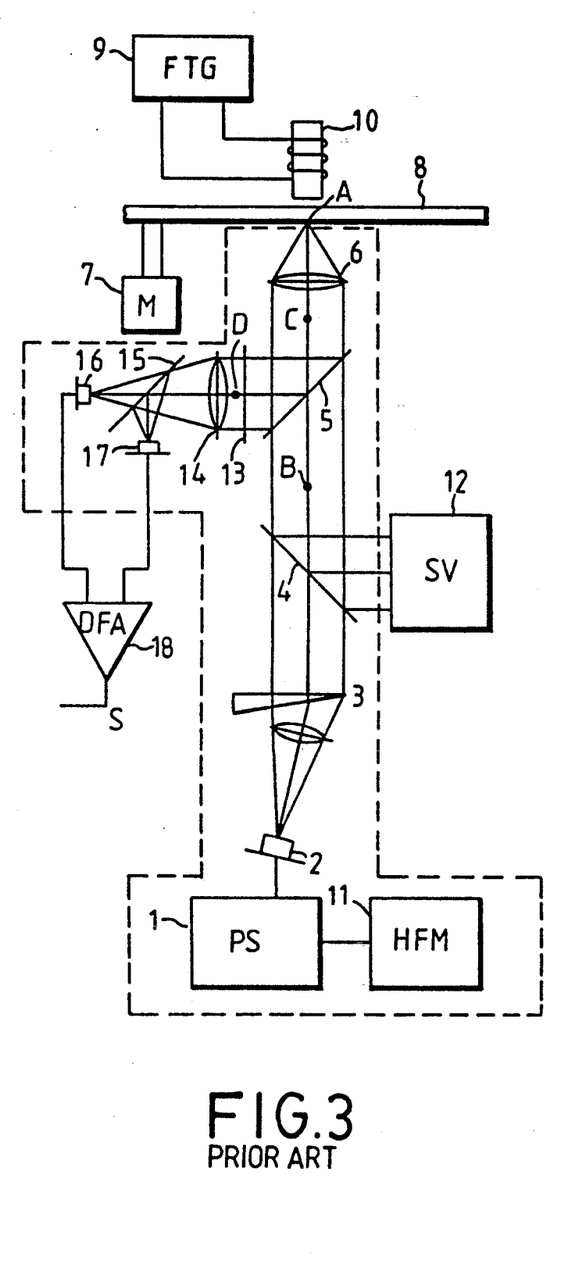
FIG. 3 is an illustration of a conventional magneto-optic recording and playback system.

FIG. 3 is an illustration of a conventional magneto-optic recording and playback system. The conventional magneto-optic recording and playback system employs an optical read/write head unit, the elements of which are enclosed by phantom lines in FIG. 3. The operation of the conventional magneto-optic recording and playback system is described briefly as follows:

When recording or erasing information, a laser diode power supply (PS) (1) is first activated so as to operate a laser diode (2). The light beam generated by the laser diode (2) is characterized by a linear (or vertical) polarization, an appropriate wave length (such as 0.78 μm) and a relatively high beam power. The light beam from the laser diode (2) passes through a collimating lens (3), a first beam splitter (4), a second beam splitter (5) and an objective lens (6) and converges to form a light spot having a diameter of approximately 1 μm. The light spot scans a data track of a disk (8) which is rotated by a motor unit (M) (7). The beam power at the scanned data track is at a minimum of 10 mW, thus heating the same so as to exceed the Curie temperature.

When recording binary data ("0" and "1" logic signals) on the disk (8), a signal generator (FTG) (9) is operated simultaneous with the operation of the optical head unit. The signal generator (9) provides current to a magnetic head unit (10) which is structured as an electromagnet. The magnetic head unit (10) is positioned perpendicular to and near the scanned data track of the disk (8). If a binary "1" (or "0") signal was generated during a definite time (t1), current in the positive (or negative) direction flows through the magnetic head unit (10), thereby allowing the magnetic head unit (10) to apply a vertical magnetic field on the scanned data track (A) of the disk (8). The direction of the vertical magnetic field depends upon the direction of current flow through the magnetic head unit (1). Note that when the scanned data track (A) is heated above the Curie temperature, a sharp change in the magnetic characteristics thereat occurs such that the direction of magnetization thereat can be aligned with the magnetic field which is applied by the magnetic head unit (10).

At a definite time (t) which is later than the definite time (t1), the light spot ceases to scan the data track (A) of the disk (8). The temperature at the portion (A) drops below the Curie temperature, and the portion (A) remains magnetized in the direction of the magnetic field applied thereto. This illustrates how recording of binary signals in a magneto-optic disk is conventionally achieved.

When it is desired to erase information contained in the disk (8), the optical head unit is operated in a manner similar to the above described recording operation. That is, the light spot which is generated by the optical head unit is used to scan the data tracks of the disk (8) which are to be erased so as to raise the temperature thereat past the Curie temperature. The signal generator (9), however, provides a direct current signal to the magnetic head unit (10), thereby erasing the contents of the disk (8).

To read the information recorded on the disk (8), a high frequency modulator (HFM) (I1) is used to modulate the power supply (1). This permits intermittent operation of the laser diode (2). Note that the operating frequency of the laser diode (2) is preferably between 100 MHz to 1 GHz. High frequency modulation is employed so as to prevent the light beam which is reflected by the disk (8) from returning to the laser diode (2) and from mixing with he light beam which is generated by the laser diode (2). The reflected light beam, if received by the laser diode (2), can cause instability in the beam power output and in the wave length of the light beam generated by the laser diode (2), thereby affecting the accuracy of the read operation.

The light beam from the laser diode (2) is linearly (or vertically) polarized and passes through the collimating lens (3). The collimating lens (3) arranges the light beam into parallel light rays which occupy a beam area (Z). The light beam passing through the collimating lens (3) has a light intensity (I0). The light beam from the collimating lens (3) passes through the first beam splitter (4).

The light beam at a point (B) after the first beam splitter (4) has a light intensity (I1). The light beam from the first beam splitter (4) passes through the second beam splitter (5). The light beam at a point (C) after the second beam splitter (5) has a light intensity (I2). The light beam from the second beam splitter (5) passes through the objective lens (6) and converges to form a light spot. The light spot has a diameter (a) which is approximately 1 μm. The light beam at the illuminated point (A) of the disk (8) has a light intensity (I3). The beam power at the data track (A) of the disk (8) is given by the formula $(I3) \times [(\pi a^2)/4]$ and is approximately equal to 1 mW.

The light beam which strikes the surface of the disk (8) is reflected downward. Depending upon the magnetization at the scanned data track (A) of the disk (8), the polarization of the reflected light beam is altered by $+\theta$ or $-\theta$. The angle ($\theta$) is usually equal to 0.5°. The reflected light beam has a light intensity (I4) and passes through the objective lens (6). The light intensity of the reflected light beam at a point (C) after the objective lens (6) has a light intensity (I5). The light beam from the objective lens (6) reaches the second beam splitter (5) and is split into a first beam which passes through the second beam splitter (5) and a second beam which is reflected.

The first beam from the second beam splitter (5) reaches the first beam splitter (4) and is split into a third beam which passes through the first beam splitter (4) and a fourth beam which is reflected. The third beam passes through the collimating lens (3) and returns to the laser diode (2).

The fourth beam is received by a servo unit (SV) (12). The servo unit (12) derives focusing and tracking error signals from the fourth beam so as to permit the former to control the focusing and tracking of the objective lens (6).

The second beam from the second beam splitter (5) has a light intensity (I6). Note that the polarization of the light beam which strikes the disk (8) is shifted by an angle ($\theta$) from a vertically polarized state when the light beam is reflected by the disk (8). The second beam from the second beam splitter (5) passes through a half-wave plate (13). The light beam at a point (D), which is after the half-wave plate (13), has a light intensity (I7), while the amplitude of the light beam thereat is (A7). The half-wave plate (13) causes a 45° shift in the polarization of the light beam passing therethrough. The vertical component of the light beam passing through the half-wave plate (13) has a light intensity (I7) and an amplitude (A8). The horizontal component of the light beam passing through the half-wave plate (13) has a light intensity (I9) and an amplitude (A9). The light beam from the half-wave plate (13) passes through a polarizing beam splitter (15) and is split into a vertically polarized beam and a horizontally polarized beam. The horizontally polarized beam is received by a first photodetector (16), while the vertically polarized beam is received by a second photodetector (17). The light intensity (I9) of the horizontally polarized beam is converted into a first electrical signal (S1) by the first photodetector (16). The light intensity (I8) of the vertically polarized beam is converted into a second electrical signal (S2) by the second photodetector (17). The first and second electrical signals (S1, S2) are received by a differential amplifier (DFA) (18). The (S1−S2) signal output of the differential amplifier (18) represents the information recorded on the disk (8). The following illustrates the relationship between the (S1−S2) signal output of the differential amplifier (18), the light intensity (I0) and the Kerr angle ($\theta$):

(1) Since only half of the light beam reaching the first beam splitter (4) can pass therethrough, the light intensity (I1)=0.5 (I0).

(2) Since only half of the light beam reaching the second beam splitter (5) can pass therethrough, the light intensity (I2)=0.5 (I1).

(3) Since all of the light beam reaching the objective lens (6) can pass therethrough, the light intensity (I3)=(I2).

(4) Since all of the light beam reaching the surface of the disk (8) is reflected, the light intensity (I4)=(I3).

(5) Since all of the reflected light beam passes through the objective lens (6), the light intensity (I5)=(I4).

(6) Since only half of the light beam from the objective lens (6) passes through the second beam splitter (5), the light intensity (I6)=0.5 (I5).

(7) Since all of the light beam reaching the half-wave plate (13) can pass therethrough, the light intensity (I7)=(I6).

(8) The amplitude (A8)=(A7)·cos (45°+$\theta$), while the light intensity (I8)=(I7)·cos$^2$(45°+$\theta$).

(9) The amplitude (A9)=(A7) sin (45°+$\theta$), while the light intensity (I9)=(I7)·sin$^2$(45°+$\theta$).

(10) The electrical signal (S1) is proportional to the beam power received by the first photodetector (16). The beam power is equal to the light intensity multiplied by the beam area. The electrical signal (S1) is therefore equal to (I8)·(Z).

(11) The electrical signal (S2) from the second photodetector (17)=(I9)·(Z).

$$(12)\ (S1-S2) = [(I8) - (I9)] \cdot (Z)$$

$$= [(I7) \cos^2 (45° + \theta) - (I7) \sin^2 (45° + \theta)] \cdot (Z)$$

$$= (I7) [(\cos 45° \cos \theta - \sin 45° \sin \theta)^2 - (\sin 45° \cos \theta + \cos 45° \sin \theta)^2] \cdot (Z)$$

$$= -(I7) \sin^2 \theta \cdot (Z)$$

$$= (-1) \times 1 \times 0.5 \times 1 \times 1 \times 1 \times 0.5 \times 0.5 \times (I0) \sin^2 \theta \cdot (Z)$$

$$\approx \tfrac{1}{8} (I0) \cdot \theta \cdot (Z)$$

The (S1−S2) signal output of the differential amplifier (18) is inverted by a succeeding electrical stage so as to obtain a voltage signal (S)$\approx \tfrac{1}{8}$(I0)·$\theta$·(Z).

It has thus been shown that the voltage signal (S) is a function of the Kerr angle ($\theta$). The information recorded on the disk ($\theta$) can thus be read by the magneto-optic recording and playback system since the Kerr angle ($\theta$) or the angle of change in the polarization of the reflected light beam depends upon the direction of the magnetization of the scanned data track of the disk (8), which direction of magnetization in turn depends upon the logic state of the recorded binary signal.

The drawbacks of the above disclosed conventional magneto-optic recording and playback system are as follows:

1. The conventional recording and playback system utilizes a high frequency modulator to minimize the adverse effects of the reflected light beam. However, the high frequency modulator can easily affect the operation of nearby electronic devices. Therefore, electromagnetic shielding should be provided so as to suppress electromagnetic radiation of the high frequency modulator. Incorporation of the electromagnetic shielding increases the size, complexity and cost of the recording and playback system.

2. The signal output of the differential amplifier is relatively weak. Note that the magnitude of the signal output of the differential amplifier is approximately equal to $\frac{1}{2}(I0)\cdot\theta\cdot(Z)$. The weak signal output of the differential amplifier is due in part to the configuration of the optical head unit and can cause improper operation of the succeeding electrical stages.

There is thus a need for a substantially "noise-free" magneto-optic recording and playback system which is smaller in size and which has a stronger electrical signal output.

SUMMARY OF THE INVENTION

Therefore, one of the objects of the present invention is to provide an improved magneto-optic recording and playback system which can provide a stronger electrical signal output than the prior art.

Another object of the present invention is to provide an improved magneto-optic recording and playback system which is smaller and more compact than the prior art.

Accordingly, the preferred embodiment of a magneto-optic reading apparatus of the present invention is used to read information on a magneto-optic recording element. The recording element has a plurality of data tracks along which the information has been previously written. The magneto-optic reading apparatus comprises:

a laser light source for generating a linearly polarized light beam;

a quarter-wave plate for converting the linearly polarized light beam into a circularly polarized light beam;

a first beam splitter for separating the circularly polarized light beam into a first beam which passes therethrough and a second beam which is reflected;

an objective lens for converging the first beam so as to scan a desired one of the data tracks of the recording element, said information written along the scanned one of the data tracks causing the polarization of the first beam to be modulated as the first beam is reflected by the recording element toward the first beam splitter, said first beam splitter further separating the first beam into a third beam which passes therethrough and a fourth beam which is reflected, said quarter-wave plate converting the third beam into a linearly polarized light beam which has a polarization that is substantially transverse to the polarization of the light beam from the laser light source;

a polarizing beam splitter provided between the laser light source and the quarter-wave plate to prevent the third beam from reaching the laser light source; and an optical signal detecting system for receiving the fourth beam from the first beam splitter so as to obtain a magnetization signal corresponding to the information along the scanned one of the data tracks.

BRIEF DESCRIPTION OF THE DRAWINGS

Other features and advantages of the present invention will become apparent in the following detailed description of the preferred embodiment, with reference to the accompanying drawings, of which.

DETAILED DESCRIPTION OF THE PREFERRED EMBODIMENT

Note that in the conventional magneto-optic recording and playback system, the information to be detected (or the Kerr angle) can be derived from the amplitude of the reflected light beam. The applied concept is similar to that used in a conventional commercial amplitude modulation (AM) receiver.

In the magneto-optic recording and playback system of the present invention, the information to be detected (or the Kerr angle) is derived from the phase of the reflected light beam. The concept thus applied is similar to that used in a conventional commercial frequency modulation (FM) receiver.

Figure 4:
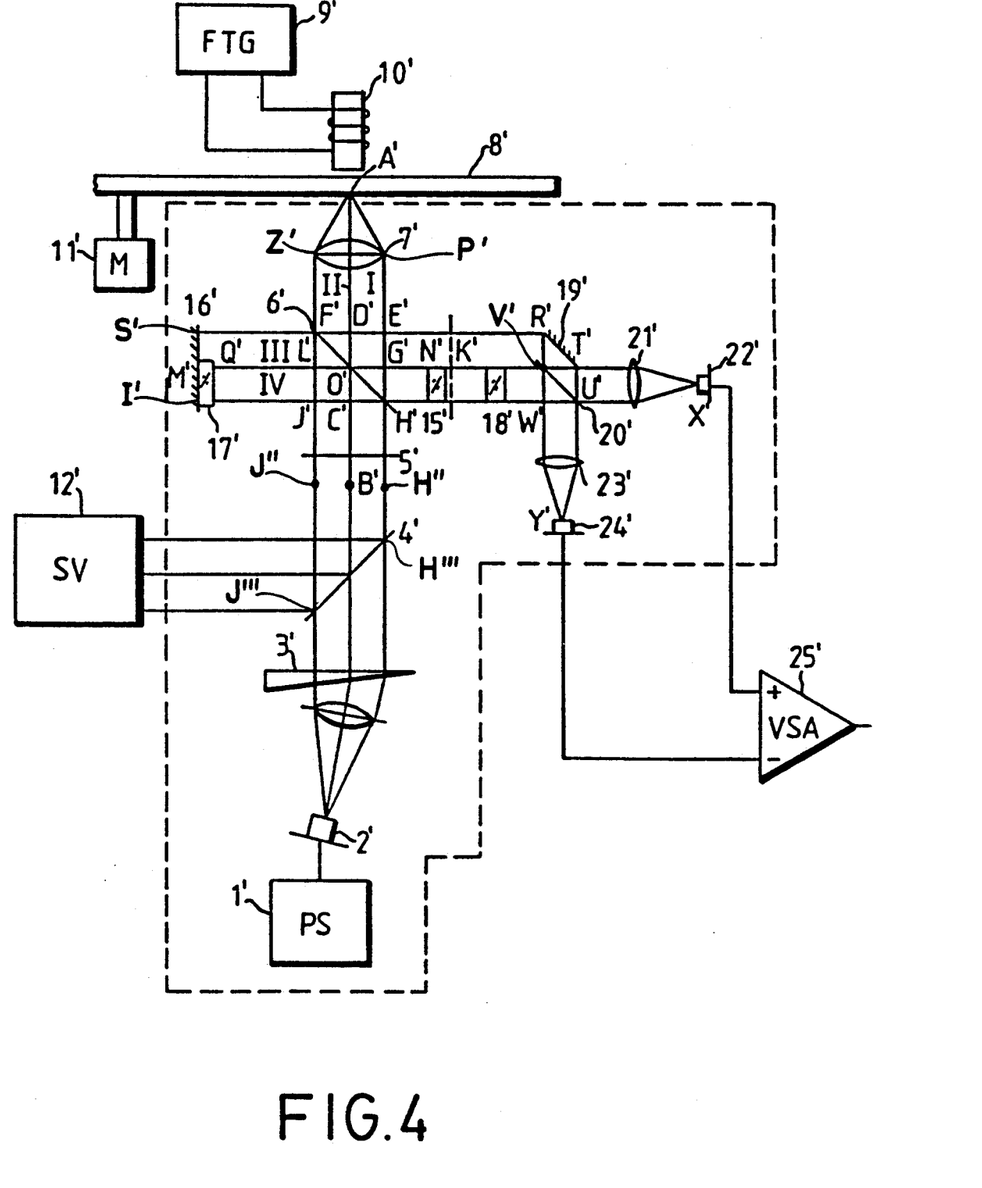
FIG. 4 is an illustration of the preferred embodiment of an improved magneto-optic recording and playback system according to the present invention.

FIG. 4 illustrates the preferred embodiment of a magneto-optic recording and playback system according to the present invention. Note that the preferred embodiment similarly employs an optical read/write head unit, the elements of which are enclosed by phantom lines in FIG. 4. The operation of the preferred embodiment is described as follows:

When recording or erasing information, a laser diode power supply (PS) (1') is first activated so as to operate a laser diode (2'). The light beam generated by the laser diode (2') is characterized by a linear (or vertical) polarization, an appropriate wave length (such as 0.78 $\mu$m) and a relatively high beam power. The light beam from the laser diode (2') passes through a collimating lens (3) and reaches a polarizing beam splitter (4'). Only vertically polarized light beams can pass through the polarizing beam splitter (4'). The light beam from the polarizing beam splitter (4') passes through a quarter-wave plate (5'), a first beam splitter (6') and an objective lens (7') and converges to form a light spot having a diameter of approximately 1 $\mu$m. The light spot scans a data track of a disk (8') which is rotated by a motor unit (M) (11'). The beam power at the scanned data track is at a minimum of 10 mW, thus heating the same so as to exceed the Curie temperature.

When recording binary data ("0" and "1" logic signals) on the disk (8'), a signal generator (FTG) (9') is operated simultaneously with the operation of the optical head unit. The signal generator (9') provides current to a magnetic head unit (10') which is structured as an electromagnet. The magnetic head unit (10') is positioned perpendicular to and near the scanned data track of the disk (8'). If a binary "1" (or "0") signal was generated during a definite time (t1), current in the positive (or negative) direction flows through the magnetic head unit (10'), thereby allowing the magnetic head unit (10') to apply a vertical magnetic field on the scanned data track (A') of the disk (8'). The direction of the vertical magnetic field depends upon the direction of current flow through the magnetic head unit (10'). Note that when the scanned data track (A') is heated above the Curie temperature, a sharp change in the magnetic characteristics thereat occurs such that the direction of magnetization therein can be aligned with the magnetic field which is applied by the magnetic head unit (10').

At a definite time (t) which is later than the definite time (t1), the light spot ceases to scan the data track (A') of the disk (8'). The temperature at the data track (A') drops below the Curie temperature, and the data track (A') remains magnetized in the direction of the magnetic field applied thereto. The procedure for recording binary signals in the magneto-optic disk (8') is therefore substantially similar to that employed in the conventional recording and playback system shown in FIG. 3.

When it is desired to erase information contained in the disk (8'), the optical head unit is operated in a manner similar to the above described recording operation. That is, the light spot which is generated by the optical head unit is used to scan the data tracks of the disk (8') which are to be erased so as to raise the temperature thereat past the Curie temperature. The signal generator (9'), however, provides a direct current signal to the magnetic head unit (10,), thereby erasing the contents of the disk (8').

To read the information recorded on the disk (8'), the power supply (1') is again activated so as to operate the laser diode (2'). The laser diode (2') generates a vertically polarized light beam. The angle of polarization ($\phi 0$) of the light beam which is generated by the laser diode (2') is at 0° (with respect to a vertical axis) at this stage.

The light beam from the laser diode (2') passes through the collimating lens (3'). The collimating lens (3') arranges the light beam into parallel light rays which occupy a beam area (Z'). The light beam at a point after the collimating lens (3') has a light intensity (I0'). Only the vertically polarized light beam from the collimating lens (3') passes through the polarized beam splitter (4'). The light beam at a point (B') upstream of the polarized beam splitter (4') has a light intensity (I1') and an angle of polarization ($\phi 1$). The light beam from the polarized beam splitter (4') passes through the quarter-wave plate (5'). The light beam at a plane J'C'H' upstream of the quarter-wave plate (5') is circularly polarized and has an amplitude vector which rotates at the plane H'C'H' with an angular velocity (w), wherein (w) is approximately equal to 10 Hz. The instantaneous angle of polarization of the light beam is ($\phi 2$) and the light intensity is (12') at this stage.

The light beam from the quarter-wave plate (5') reaches the first beam splitter (6') and is split into a beam (O'A') which passes through the first beam splitter (6') and a beam (O'Q') which is reflected, 1. Path of the beam (O'Q')

The instantaneous angle of polarization of the beam (O'Q') from the first beam splitter (6') at a plane F'D'E' is ($\phi 3$), while the light intensity thereat is (13'). In order to facilitate the explanation of the succeeding operations, the plane F'D'E' is divided into a first region (I) (plane D'E') and a second region (II) (plane F'D'). The instantaneous angle of polarization at the first region (I) is ($\phi 4$), while the light intensity thereat is (14'). The instantaneous angle of polarization at the second region (II) is ($\phi 5$), while the light intensity thereat is (15').

The beam within the first region (I) passes through the objecting lens (7') and converges to form a light spot which scans a data track of the disk (8'). The instantaneous angle of polarization is ($\phi 6$), while the light intensity is (16') at this stage. A typical light ray (E'P'A') in this beam strikes the surface of the disk (8') and is reflected downward, thereby altering its polarization by the Kerr angle ($\theta$). The instantaneous angle of polarization is ($\phi 7$), while the light intensity of the light beam (e.g., light ray (A'A')) after being reflected is (17').

The reflected light beam (e.g., ray (A'Z'F')) passes through the objective lens (7'). The instantaneous angle of polarization of the beam (Z'F') at the plane F'D' after the objective lens (7') is ($\phi 8$), while the light intensity thereat is (18'). The light beam (Z'F') from the objective lens (7') reaches the first beam splitter (6') and is split into a beam (F'J') which passes therethrough and a beam (F'Z') which is reflected.

The beam (F'J') from the first beam splitter (6') is a circularly polarized beam which reaches a plane J'C'. The beam then passes through the quarter-wave plate (5') and is converted into a linearly polarized beam (J"J''') upon reaching the polarized beam splitter (4'). Note that the angle of polarization of the beam (J"J''') at this stage should be transverse to the angle ($\phi 1$). Thus, if angle ($\phi 1$) is vertically polarized, the beam should be horizontally polarized. The horizontally polarized beam (J"J''') is reflected by the polarized beam splitter (4') and is received by a servo unit (SV) (12'). The servo unit (12') derives focusing and tracking error signals from the beam (J"J''') so as to permit the former to control the focusing and tracking of the objective lens (7').

The reflected beam (F'E') from the first beam splitter (6') passes through a plane D'G'. The reflected beam (F'E') has an instantaneous angle of polarization ($\phi 9$) and a light intensity (19') at this stage. The beam (F'E') eventually reaches a plane K', where its instantaneous angle of polarization is ($\phi 10$) and its light intensity is (I10'). The beam (E'R') then strikes a plane mirror (19') and is reflected towards a second beam splitter (20'). The second beam splitter (20') splits the beam (R'V') into a beam (V'W'Y') which passes therethrough and a beam (V'T'X') which is reflected.

The beam (V'W'Y') passes through a plante W'U'. The V'W'Y' beam has an instantaneous angle of polarization ($\phi 11$) and a light intensity (I11') at this stage. The beam (W'Y') has a beam area (Z1)[(Z1=0.5)(Z)] and passes through a focusing lens (23') for reception by a photodetector (24') at a center point (Y') of the latter.

The beam (V'T'X') passes through a plante T'U'. The beam (V'T'X') has an instantaneous angle of polarization ($\phi 12$) and alight intensity (I12') at this stage. The beam (T'X') has a beam area (Z")[(Z")=0.5)Z2)] and passes through a focusing lens (21') for reception by a photodetector (22') at a center point (X') of the latter.

The beam within the second region (II) passes through the objective lens (7') and converges to form a light spot which scans a data track on the disk (8'). The instantaneous angle of polarization is ($\phi 13$), while the light intensity if (I13') at this stage. The beam (F'Z'A') strikes the surface of the disk (8') and is reflected downward, thereby altering its polarization by the Kerr angle ($\theta$). The instantaneous angle of polarization is ($\phi 14$), while the light intensity of the light beam after being reflected (A'P') is (I14').

The reflected light beam passes through the objective lens (7'). The instantaneous angle of polarization of the light beam (P'E') at the plane D'E' after the objective lens (7') is ($\phi 15$), while the light intensity thereat is (I15'). The light beam (P'E'H') from the objective lens (7') reaches the first beam splitter (6') and is split into a beam (H'H") which passes therethrough and a beam (H'15') which is reflected.

The beam (H'H") from the first beam splitter (6') is a circularly polarized beam which reaches a plane C'H'.

The beam (H'H") then passes through the quarter-wave plate (5') and is converted into a lienarly pola4ized beam (H'H"') upon reaching the polarized beam splitter (4'). Note that the angle of polarization of the beam (H"H"') at this stage should be transverse to the angle ($\phi 1$). Thus, if angle ($\phi 1$) is vertically polarized, the beam should be horizontally polarized. The horizontally polarized beam is reflected by the polarized beam splitter (4') and is received by the servo unit (12'). The servo unit (12') derives focusing and tracking error signals from the beam (H"H"') so as to control the focusing and tracking of the objective lens (7').

The reflected beam E'H'15') from the first beam splitter (6') passes through a plane G'H'. The reflected beam has an instantaneous angle of polarization ($\phi 16$) and a light intensity (I16') at this stage. The beam passes through an optical path increment plate (15') before reaching the plante K'. The optical path increment plate (15') is a thin plate made of a material which has a refractive index (n). The thickness of the optical path increment plate (15') is equal to $\lambda/4 \cdot [1/(n-1)]$. The beam has an instantaneous angle of polarization ($\phi 17$), which is 90° out of phase relative to the angle ($\phi 10$), and has a light intensity (I17') at this stage.

The beam then passes through an optical path increment plate (18') before reaching the second beam splitter (20'). The optical path increment plate (18') is a thin plate made of a material which has a refractive index (n). The thickness of the optical path increment plate (18') is equal to the optical path (R'V') multiplied by a factor $[1/(n-1)]$. The optical path increment plates (15', 18') are used to compensate for the longer optical path (R'V') traversed by the beam (E'R'V'). The second beam splitter (20') splits the beam into a beam (U'X') which passes therethrough a beam (U'Y') which is reflected.

The beam (U'X') passes through the plane T'U'. The beam has an instantaneous angle of polarization ($\phi 18$) and a light intensity (I38') at this stage. The beam has a beam area (Z2) and passes through the focusing lens (21') for reception by the photodetector (22') at the center point (X') of the latter.

The beam (U'Y') passes through the plane W'U'. The beam has an instantaneous angle of polarization ($\phi 19$) and a light intensity (I19') at this stage. The beam has a beam area (Z1) and passes through the focusing lens (23') for reception by the photodetector (24') at the center point (Y') of the latter.

2. Path of the beam (O'Q')

The instantaneous angle of polarization of the beam (Q'Q'), which is reflected by the first beam spliter (6'), at a plane F'L'J' is ($\phi 20$), while the lighe intensity thereat is (I20'). In order to facilitate the explanation of the succeeding/operations, the plane F'L'J' is divided into a third region (III) (plane F'L') and a fourth region (IV) (plane L'J'). The instantaneous angle of polarization as the third region (III) is ($\phi 21$), while the light intensity thereat is (I21'). The instantaneous angle of polarization at the fourth region (IV) is ($\phi 22$), while the light intensity thereat is (I22').

The beam within the thrid region (III) is refelcted by a plane mirror (16') backgrowards the plane F'L'. The instantneous angle of polarization is ($\phi 23$), while the light intensity is (I23') at this stage. The refelcted beam reaches the first beam splitter (6') and is divided into ab eam (F'E) which passes therethrough and a beam (F'J') which is reflected.

The beam (F'E') from the first beam splitter (6') passes through the plane E'G'. The beam has an instantaneous angle of polarization ($\phi 24$) and a light intensity (I24') at this stage. The beam eventually reaches a plane K', where its instantaneous angle of polarization is ($\phi 25$) and its light intensity is (I25'). The beam then strikes the plane mirror (19') and is reflected towards the second beam splitter (20'). The second beam splitter (20') splits the beam into a beam (V'W'Y') which passes therethrough and a beam (V'W'Y') which is refelcted.

The beam (V'W'Y') passes through the plane W'U'. The beam has an instantaneous angle of polarization ($\phi 26$) and a light intensity (I26') at this stage. The beam has a beam area (Z1) and passes through the focusing lens (23') for reception by the photodetector (24') at the center point (Y') of the latter.

The beam (V'T'X') passes through the plane T'U'. The beam has an instantaneous angle of polarization ($\phi 27$) and a light intensity (I27') at this stage. The beam has a beam area (Z2) and passes through the focusing lens (21') for reception by the photodetector (22') at the center point (X') of the latter.

The beam (S'F'J'), which is reflected by the first bea splitter (6'), is a circularly polarized beam that reaches the plane J'C'. The beam then passes through the quarter-wave plate (5') and is converted into a linearly polarized beam (J"J"') upon reaching the polarized beam splitter (4'). The angle of polarization of the beam at this stage should be transverse to the angle ($\phi 1$). Thus, if the angle ($\phi 1$) is vertically polarized, the beam should be horizontally polarized. The horizontally polarized beam is refelcted by the polarized beam splitter (4') and is received by the servo unit (12'). The beam (S'F'J'J"J"') provides a dc current signal to the servo unit (12').

The beam (H'I') from the fourth region (IV) passes through an optical path increment plate (17') before reaching the plane mirror (16'). Upon being reflected by the plane mirror (16'), the beam (I'H') again passes through the optical path increment plate (17') before returning to the plane L'J'. The instantaneous angle of polarization is ($\phi 28$), while the light intensity is (I28') at this stage. The optical path increment plate (17') is a thin plate made of a material which has a refractive index (n). The thickness of the optical path increment plate (17') is equal to $(\lambda/4) \cdot [1/(n-1)]$. The angle of polarization ($\phi 28$) is 180° out of phase relative to the angle of polarization ($\phi 23$). The beam (I'H') reaches the first beam splitter (6') and is split into a beam (J'H'W') which passes therethrough and a beam (J'H'H") which is reflected.

The beam (J'H'W') from the first beam splitter (6') passes through the plane G'H'. The beam has an instantaneous angle of polarization ($\phi 29$) and a light intensity (I29') at this stage. The beam passes through the optical path increment plate (15') before reaching the plane K'. The beam has an instantaneous angle of polarization ($\phi 30$), which is 90° out of phase relative to the angle ($\phi 25$), and has a light intensity (I30') at this stage. The beam then passes through the optical path increment path increment plate (18') before reaching the second beam splitter (20'). The optical path increment plates (15', 18') are used to compensate for the longer optical path (R'V') traversed by the beam (E'R'V'). The second beam splitter (20') splits the beam (K'W'U') into a beam (W'U'X') which passes therethrough and a beam (W'U'Y') which is reflected, The beam (W'U'X') passes through the plane T'U' and has an instantaneous angle of polarization (φ31) and a light intensity (I31') at this stage. The beam has a beam area (Z2) and passes through the focusing lens (21') for reception by the photodetector (22') at the center point (X') of the latter.

The beam (W'U'Y') passes through the plane W'U' and has an instantaneous angle of polarization (φ32) and a light intensity (I32') at this stage. The beam has a beam area (Z1) and passes through the foxising lens (23') for reception by the photodetector (24') at the center point (Y') of the latter.

The beam (Q'O'C') reflected by the first beam splitter (6') is a circularly polarized beam which reaches the plane J'C'H'. The beam then passes through the quarter-wave plate (5') and is converted into alinearly polarized beam (H'H''') before reaching the polarized beam splitter (4'). The angle of polarization of the beam at this stage should be transverse to the angle (φ1). thus, if the angle (φ1) is vertically polarized, the bea should be horizontally polarized. The horizontally polarized beam is reflected by the polarized beam splitter (4') and is received by the servo unit (12'). The beam (I'H'H''H''') provides a dc current signal to the servo unit (12').

Computations involving the light beam traversing the first region (I):

The angle of polarization:

1. Since no change in the polarization of the light beam from the laser diode (2') occurs as it passes through the polarized beam splitter (4'), the angle of polarization $(\phi1)=(\phi0)=0°$.

2. The quarter-wave plate (5') converts the light beam from the laser diode (2') into a circularly polarized beam. The change in the angle of polarization is equal to the product of the angular velocity (w) and a time (t) which starts from the time when the linearly polarized light beam from the laser diode (2') is converted into a circularly polarized beam. The angle of polarization $(\phi2)=wt+(\phi1)=wt$.

3. Since the first beam splitter (6') does not affect the polarization of the light beam, $(\phi3)=(\phi2)+(2\pi/\lambda)\cdot C'D'$.

4. The angle of polarization (φ4) at the first region (I)=the angle of polarization (φ3).

5. Since the objective lens (7') does not affect the polarization of the light beam which passes therethrough, $(\phi6)=(\phi4)+(2\pi/\lambda)\cdot(D'P'+P'A')$.

6. Since the polarization of the light beam which is reflected by the surface of the disk (8') is altered by the Kerr angle (θ), $(\phi7)=(\phi6)+(\theta)$.

7. Since the objective lens (7') does not affect the ol polarization of light beam passing therethrough, $(\phi8)=(\phi7)+(2\pi/\lambda)\cdot(A'P'+P'D')$.

8. Since the first beam splitter (6') does not affect the polarization of light beam passing therethrough, $(\phi9)=(\phi8)+(2\pi/\lambda)\cdot(D'O'+O'G')$.

9. $(\phi10)=(\phi9)+(2\pi/\lambda)\cdot(G'N'+N'K')$.

10. Since the plane mirror (19') and the second beam splitter (20') do not affect the polarization of light beam passing thereat, $(\phi11)=(\phi10)+(2\pi/\lambda)\cdot(K'U+R'U+UW')$ and $(\phi12)=(\phi10)+(2\pi/\lambda)\cdot(K'U+r'U+UT')$.

11. The angles of polarization (φ11, φ12) in terms of the angular velocity (w) and the Kerr angle (θ) are as follows:

$(\phi11)=wt+\theta+(2\pi/\lambda)\cdot L1$; and $(\phi12)=wt+\theta+(2\pi/\lambda)\cdot L2$;

wherein:
L1=C'D'+D'P'+P'A'+A'P'+P'D'+D'O'+O'G'+G'N'+N'K'+K'U+R'U+UW'; and
L2=C'D'+D'P'+P'A'+A'P'+P'D'+D'O'+O'G'+G'N'+N'K'+K'U+R'U+T'U.

The light intensity:

1. Since all of the light beam reaching the polarized beam splitter (4') can pass therethrough, (I1')=(I0').

2. Since all of the light beam reaching the quarter-wave plate (5') can pass therethrough, (I2')=(I1').

3. Since only half of the light beam reaching the first beam splitter (6') can pass therethrough, (I3')= 0.5·(I2').

4. The light intensity (I4') at the first region (I)=the light intensity (I3').

5. Since all of the light beam reaching the objective lens (7') can pass therethrough, (I6')=(I4').

6. Since all of the light beam striking the surface of the disk (8') is reflected, (I7')=(I6').

7. Since all of the light beam reaching the objective lens (7') can pass therethrough, (I8')=(I7').

8. Since only half of the light beam reaching the first beam splitter (6') is reflected, (I9')=0.5·(I8').

9. (I10')=(I9').

10. The plane mirror (19') refleots all light which strikes the same to the seoond beam splitter (20'). The second beam splitter (20') allows half of the light beam to pass therethrough and half of the light beam to be reflected. Therefore, (I11')=(I12')=0.5·(I10').

11. The light intensities (I11') and (I12') [in terms of the light intensity (I0')]=(⅛)·(I0'). Computations involving the light beam traversing the second region (II):

The angle of polarization:

1. $(\phi1)=(\phi0)=0°$.
2. $(\phi2)=wt+(\phi1)=wt$.
3. $(\phi3)=(\phi2)+(2\pi/\lambda)\cdot C'D'$.

4. The angle of polarization (φ5) at the second region (II)=the angle of polarization (φ3).

5. Since the objective lens (7') does not affect the polarization of light beam passing therethrough, $(\phi13)=(\phi5)+(2\pi/\lambda)\cdot(D'P'+P'A')$.

6. Since the polarization of the light beam which is reflected by the surface of the disk (8') is altered by the Kerr angle (θ), $(\phi14)=(\phi13)+(\theta)$.

7. Since the objective lens (7') does not affect the polarization of light beam passing therethrough, $(\phi15)=(\phi14)+(2\pi/\lambda)\cdot(A'P'+P'D')$.

8. Since the first beam splitter (6') does not affect the polarization of light beam reflected thereby, $(\phi16)=(\phi15)+(2\pi/\lambda)\sqrt{}(D'O'+O'G')$.

9. Because of the presence of the optical path lengthening plate (15'), $$(\phi17) = (\phi16) + (2\pi/\lambda) \cdot (G'N' + n \cdot N'K')$$
$$= (\phi16) + (2\pi/\lambda)(G'N' + N'K') + (2\pi/\lambda) \cdot (n - 1)(N'K')$$
$$= (\phi16) + (2\pi/\lambda)(G'N' + N'K') + \pi/2$$

10. Since the optical path lengthening plate (19') increases the optical path by R'U, and since the second beam splitter (20') does not affect the polarization of light beam passing thereat, $$(\phi 18) = (\phi 17) + (2\pi/\lambda) \cdot (K'U + R'U + UT') \text{ and}$$

$$(\phi 19) = (\phi 17) + (2\pi/\lambda) \cdot (K'U + R'U + UW').$$

11. The angles of polarization ($\phi 18$, $\phi 19$) in terms of the angular velocity (w) and the Kerr angle ($\theta$) are as follows:

$$(\phi 18) = wt + \theta + (\pi/2) + (2\pi/\lambda) \cdot L2; \text{ and}$$

$$(\phi 19) = wt + \theta + (\pi/2) + (2\pi/\lambda) \cdot L1.$$

The light intensity:
1. (I1')=(I0').
2. (I2')=(I1').
3. (I3')=0.5·(I2').
4. The light intensity (15') at the second region (II)=-the light intensity (I3').
5. Since all of the light beam reaching the objective lens (7') can pass therethrough, (I13')=(I5').
6. Since all of the light beam striking the surface of the disk (8') is reflected, (I14')=(I13').
7. Since all of the light beam reaching the objective lens (7') can pass therethrough, (I15')=(I14').
8. Since only half of the light beam reaching the first beam splitter (6') is reflected, (I16')=0.5·(I15').
9. Since all of the light beam reaching the optical path lengthening plate (15') can pass therethrough, (I17')=(I16').
10. All of the light beam reaching the optical path lengthening plate (18') can pass therethrough. The plane mirror (19') reflects all light which strikes the same to the second beam splitter (20'). The second beam splitter (20') allows half of the light beam to pass therethrough and half of the light beam to be reflected. Therefore, (I18')=(I19')=0.5 (I17').
17. The light intensities (I18') and (I19') [in terms of the light intensity (I0')] = ($\frac{1}{8}$)·(I0').

Note that in the read operation conducted by the preferred embodiment, the light beam present at the plane F'D'E' passes through the objective lens (7') and converges so as to form the light spot on the disk (8'). The light spot has a diameter (a) which is approximately equal to 1 μm and has a beam power {(I6')·[($\pi a^2$)/4]} of at least 1 mW to permit recovery of the information stored on the disk (8').

Computations involving the light beam traversing the third region (III):

The angle of polarization:
1. ($\phi 1$)=($\phi 0$)=0°.
2. ($\phi 2$)=wt+($\phi 1$)=wt.
3. Since the first beam splitter (6') does not affect the polarization of light beam reflected thereby, ($\phi 20$)=($\phi 2$)+(2π/λ)·(C'O'+O'L').
4. The angle of polarization ($\phi 21$) at the third region (III)=the angle of polarization ($\phi 20$).
5. Since the plane mirror (16') does not affect the angle of polarization of the light beam which is reflected by the same, ($\phi 23$)=($\phi 21$)+(2π/λ)√(L'Q'+Q'M'+M'Q'+Q'L').

6. Since the first beam splitter (6') does not affect the polarization of the light beam which passes therethrough, ($\phi 24$)=($\phi 23$)+(2π/λ)·(L'O'+O'G').

7. ($\phi 25$)=($\phi 24$)+(2π/λ)·(G'N'+N'K').

8. Since the plane mirror (19') and the second beam splitter (20') do not affect the polarization of light beam passing thereat, $$(\phi 26) = (\phi 25) + (2\pi/\pi) \cdot (K'U + R'U + UW') \text{ and}$$

$$(\phi 27) = (\phi 25) + (2\pi/\lambda) \cdot (K'U + R'U + UT').$$

9. The angles of polarization ($\phi 26$, $\phi 27$) in terms of the angular velocity (w) and the Kerr angle ($\theta$) are as follows:

$$(\phi 26) = wt + (2\pi/\lambda) \cdot L3; \text{ and}$$

$$(\phi 27) = wt + (2\pi/\lambda) \cdot L4;$$

wherein:
L3=C'O'+O'L'+L'Q'+Q'M'+M'Q'+Q'L'+L'O'+O'G'+G'N'+N'K'+K'U+R'U+UW'; and
L4=C'O!+O'L'+L'Q'+Q'M'+M'Q'+Q∝L'+L'O'+O'G'+G'N'+N'K'+K'U+R'U+UT'.

The light intensity:
1. (I1')=(I0').
2. (I2')=(I1').
3. Since only half of the light beam reaching the first beam splitter (6') is reflected, (I20')=0.5·(I2').
4. The light intensity (I21') at the third region (III)=-the light intensity (I20').
5. Since all of the light beam reaching the plane mirror (16') is reflected, (I23')=(I21').
6. Since only half of the light beam reaching the first beam splitter (6') can pass therethrough, (I24')=0.5·(I23').
7. (I25')=(I24')
8. The plane mirror (19') reflects all light which strikes the same to the second beam splitter (20'). The second beam splitter (20') allows half of the light beam to pass therethrough and half of the light beam to be reflected. Therefore, (I26') (I27')=0.5·(I25').
9. The light intensities (I26') and (I27') [in terms of the light intensity (I0')]=($\frac{1}{8}$)·(I0').

Computations involving the light beam traversing the fourth region (IV):

The angle of polarization:
1. ($\phi 1$)=($\phi 0$)=0°.
2. ($\phi 2$)=wt+($\phi 1$)=wt.
3. ($\phi 20$)=($\phi 2$)+(2π/λ)·(C'O'+O'L').
4. The angle of polarization ($\phi 22$) at the fourth region (IV)=the angle of polarization ($\phi 20$).
5. The optical path lengthening plate (17') increases the optical path, and the plane mirror (16) does not affect the polarization of light beam reflected thereby. Therefore, $$\begin{aligned}
(\phi 28) &= (\phi 22) + (2\pi/\lambda) \cdot (L'Q' + n \cdot Q'M' + n \cdot M'Q' + Q'L') \\
&= (\phi 22) + (2\pi/\lambda) \cdot (L'Q' + Q'M' + M'Q' + Q'L') + (2\pi/\lambda) \cdot (n-1)(Q'M' + M'Q') \\
&= (\phi 22) + (2\pi/\lambda) \cdot (L'Q' + Q'M' + M'Q' + Q'L') + (2\pi/\lambda) \cdot (n-1)(2Q'M')
\end{aligned}$$

-continued $$= (\phi 22) + (2\pi/\lambda) \cdot (L'Q' + Q'M' + M'Q' + Q'L') + (2\pi/\lambda) \cdot (n - 1) [2\lambda/4 (n - 1)]$$

$$= (\phi 22) + (2\pi/\lambda) \cdot (L'Q' + Q'M' + M'Q' + Q'L') + (\pi)$$

6. Since the first beam splitter (6') does not affect the polarization of light beam passing theretrhough, $(\phi 29) = (\phi 28) + (2\pi/\lambda) \cdot (L'O' + O'G')$.

7. Because of the presence of the optical path lengthening plate (15'), $$(\phi 30) = (\phi 29) + (2\pi/\lambda) \cdot (G'N' + n \cdot N'K')$$

$$= (\phi 29) + (2\pi/\lambda) (G'N' + N'K') + (2\pi/\lambda) \cdot (n - 1) (N'K')$$

$$= (\phi 29) + (2\pi/\lambda) (G'N' + N'K') + (2\pi/\lambda) \cdot (n - 1) [\lambda/4 (n - 1)]$$

$$= (\phi 29) + (2\pi/\lambda) (G'N' + N'K') + (\pi/2)$$

8. Since the optical path lengthening plate (19') increases the optical path by R'U, and since the second beam splitter (20') does not affect the polarization of light beam passing thereat, $$(\phi 31) = (\phi 30) + (2\pi/\lambda) \cdot (K'U + R'U + UT') \text{ and}$$

$$(\phi 32) = (\phi 30) + (2\pi/\lambda) \cdot (K'U + R'U + UW').$$

9. The angles of polarization ($\phi 31$, $\phi 32$) in terms of the angular velocity (w) and the Kerr angle ($\theta$) are as follows:

$$(\phi 31) = wt + (3\pi/2) + (2\pi/\lambda) \cdot L4; \text{ and}$$

$$(\phi 32) = wt + (3\pi/2) + (2\pi/\lambda) \cdot L3.$$

The light intensity:
1. (I1') = (I0').
2. (I2') = (I1').
3. (I20') = 0.5·(I2').
4. The light intensity (I22') at the fourth region (IV) = the light intensity (I20').
5. Since all of the light beam reaching the optical path lengthening plate (17') can pass therethrough, and since all of the light beam reaching the plane mirror (16') is reflected, (I28') = (I22').
6. Since only half of the light beam reaching the first beam splitter (6') can pass therethrough, (I29') = 0.5·(I28').
7. Since all of the light beam reaching the optical path lengthening plate (15') can pass therethrough, (I30') = (I29').
8. The plane mirror (19') reflects all light which strikes the same to the second beam splitter (20'). The second beam splitter (20') allows half of the light beam to pass therethrough and half of the light beam to be reflected. Thereofre, (I31') = (I32') = 0.5·(I30').
9. The light intensities (I31') and (I32') [in terms of the light intensity (I0')] = ($\frac{1}{8}$)·(I0').

The amptlidute (Ax) of a light beam passing through the plane T'U' is equal to the sum of the amplitudes of the light beam components from the four regions (I-IV):

$$Ax = AI + AII + AIII + AIV$$

$$= A_{12} e^{i(\phi 12)} + A_{18} e^{i(\phi 18)} + A_{27} e^{i(\phi 27)} + A_{31} e^{i(\phi 31)}$$

$$= \sqrt{I_{12}} \; e^{i[wt + \theta + (2\pi/\lambda) \cdot L2]} +$$

$$\sqrt{I_{18}} \; e^{i[wt + \theta + (\pi/2) + (2\pi/\lambda) \cdot L2]} +$$

$$\sqrt{I_{27}} \; e^{i[wt + (2\pi/\lambda) \cdot L4]} +$$

$$\sqrt{I_{31}} \; e^{i[wt + (3\pi/2) + (2\pi/\lambda) \cdot L4]}$$

If $L1 = L2 = L3 = L4 = L$, $$Ax = 8^{-\frac{1}{2}} (I0')^{\frac{1}{2}} \cdot e^{i(2\pi/\lambda) \cdot L} \cdot e^{i(wt)} \cdot \{e^{i(\theta)} + e^{i[(\theta) + (\pi/2)]} + 1 + e^{i[(\theta) + (3\pi/2)]}\}$$

$$= 8^{-\frac{1}{2}} (I0')^{\frac{1}{2}} \cdot e^{i(2\pi/\lambda) \cdot L} \cdot e^{i(wt)} \cdot \{e^{i(0)} + 1 + i \cdot [e^{i(\theta)} - 1]\}$$

$$= 8^{-\frac{1}{2}} (I0')^{\frac{1}{2}} \cdot e^{i(2\pi/\lambda) \cdot L} \cdot e^{i(wt)} \cdot e^{i(\theta/2)} \cdot \{[e^{i(\theta/2)} + e^{-i(\theta/2)}] + i \cdot [e^{i(\theta/2)} - e^{-i(\theta/2)}]\}$$

$$= 8^{-\frac{1}{2}} (I0')^{\frac{1}{2}} \cdot e^{i[(2\pi/\lambda) L + wt + (\theta/2)]} \cdot [2 \cos (\theta/2) - 2 \sin (\theta/2)]$$

$$= 2^{-\frac{1}{2}} (I0')^{\frac{1}{2}} \cdot e^{iB} \cdot [\cos (\theta/2) - \sin (\theta/2)]$$

wherein, $B = (2\pi/\lambda) \cdot L + wt + (\theta/2)$.

The lisht intensity (Ix) of a light beam passing through the plane T'U' is computed as follows:

$$Ix = Ax \cdot Ax^*$$

$$= 2^{-\frac{1}{2}} (I0')^{\frac{1}{2}} \cdot e^{iB} \cdot [\cos (\theta/2) - \sin (\theta/2)] \cdot \{2^{-\frac{1}{2}} (I0')^{\frac{1}{2}} \cdot e^{-iB} \cdot [\cos (\theta/2) - \sin (\theta/2)]\}$$

$$= \frac{1}{2} \cdot (I0') \cdot [\cos (\theta/2) - \sin (\theta/2)]^2$$

$$= \frac{1}{2} \cdot (I0') \cdot [\cos^2 (\theta/2) - 2 \cos (\theta/2) \sin (\theta/2) + \sin^2 (\theta/2)]$$

$$= \frac{1}{2} \cdot (I0') \cdot (1 - \sin \theta)$$

$$\approx \frac{1}{2} \cdot (I0') \cdot (1 - \theta)$$

The amplitude (Ay) of a light beam passing through the plane W'U' is computed as follows:

$$Ay = AI' + AII' + AIII' + AIV'$$

$$= A_{11} e^{i(\phi 11)} + A_{19} e^{i(\phi 19)} + A_{26} e^{i(\phi 26)} + A_{32} e^{i(\phi 32)}$$

$$= \sqrt{I_{11}} \; e^{i[wt + \theta + (2\pi/\lambda) \cdot L1]} +$$

$$\sqrt{I_{19}} \; e^{i[wt + \theta + (\pi/2) + (2\pi/\lambda) \cdot L1]} +$$

$$\sqrt{I_{26}} \; e^{i[wt + (2\pi/\lambda) \cdot L3]} +$$

-continued $$\sqrt{I_{32}}\ e^{i[\omega t+(3\pi/2)+(2\pi/\lambda)\cdot L3]}$$

$$=2^{-\frac{1}{2}}(I0')^{\frac{1}{2}}\cdot e^{iB}\cdot[\cos(\theta/2)-\sin(\theta/2)]$$

The light intensity (Iy) of a light beam passing through the plane W'U' is computed as follows:

$$\begin{aligned}Iy &= Ay\cdot Ay^*\\ &\approx \tfrac{1}{2}\cdot(I0')\cdot(1-\theta)\end{aligned}$$

The beam power received by the photodetector (22') is computed as follows:

$$\begin{aligned}POWERx &= Ix\cdot(0.5)(Z)\\ &= \tfrac{1}{4}\cdot(I0')\cdot(1-\theta)(Z)\end{aligned}$$

Since the voltage signal (Vx) generated by the photodetector (22') is proportional to the beam power received thereby, $$Vx=\tfrac{1}{4}\cdot(I0')\cdot(1-\theta)(Z)$$

The beam power received by the photodetector (24') is computed as follows:

$$\begin{aligned}POWERy &= Iy\cdot(0.5)(Z)\\ &= \tfrac{1}{4}\cdot(I0')\cdot(1-\theta)(Z)\end{aligned}$$

Since the voltage signal (Vy) generated by the photodetector (24') is proportional to the beam power received thereby, $$Vy=\tfrac{1}{4}\cdot(I0')\cdot(1-\theta)(Z)$$

The voltage signals (Vx, Vy) from the photodetectors (22', 24') are received by a voltage summing amplifier (VSA) (25') so as to generate a voltage signal (V) which is computed as follows:

$$\begin{aligned}V &= Vx+Vy\\ &= \tfrac{1}{2}\cdot(I0')\cdot(1-\theta)(Z)\\ &= \tfrac{1}{2}\cdot(I0')\cdot(Z)-\tfrac{1}{2}(I0')(\theta)(Z)\\ &= V(DC)-V(AC)\end{aligned}$$

The direct current component [V(DC)] of the voltage signal (V) is disregarded, and the alternating current component [V(AC)] of the voltage signal (V) is inverted by a succeeding electrical stage so as to obtain a voltage signal $(S')=\tfrac{1}{2}(I0')(\theta)(Z)$. Note that the voltage signal (S') is shown to be a function of the Kerr angle ($\theta$). The information recorded on the disk (8') can thus be read by the system of the present invention since the Kerr angle ($\theta$) depends upon the direction of the magnetization of the illuminated portion of the disk (8'), which in turn depends upon the logic state of the recorded binary signal.

During the recording and/or erasing operation of the preferred embodiment, the optical head unit provides a light spot with a relatively high beam power so as to permit the temperature at the scanned data track of the disk (8') to exceed the Curie temperature.

The concept behind the read operation performed by the preferred embodiment is different from that which is applied by the prior art. The characterizing features of the preferred embodiment are as follows:

1. In the preferred embodiment, a circularly polarized light beam is used to strike the magneto-optic disk. The phase of the reflected light beam is altered by the Kerr angle ($\theta$) and is received by the optical head unit. The optical head unit then receives the reflected light beam and is able to generate an electrical signal which is a function of the Kerr angle ($\theta$), thus enabling the preferred embodiment to read the binary data recorded on the disk (8').

2. The light beam output of the laser diode passes through a polarized beam splitter and through a quarter-wave plate so as to change its polarization into a circularly polarized state and to prevent the same from returning to the laser diode.

3. Since no light beam is returned to the laser diode, there is no need to provide a high frequency modulator, as is required in the prior art. The cost, complexity and size of the present invention is therefore smaller than that of the prior art.

4. The voltage signal which is generated by the preferred embodiment is $\tfrac{1}{2}\cdot(I0')\cdot\theta\cdot(Z)$ and is stronger than that which is generated by the prior art. This facilitates signal processing at the succeeding electrical stages.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A magneto-optic reading apparatus for reading information on a magneto-optic recording element, said recording element having a plurality of data tracks along which said information has been previously written, said magneto-optic reading apparatus comprising:

a laser light source for generating a linearly polarized light beam;

a quarter-wave plate for converting said linearly polarized light beam into a circularly polarized light beam;

a first beam splitter for separating said circularly polarized light beam into a first beam which passes therethrough and a second beam which is reflected;

an objective lens for converging said first beam so as to scan a desired one of said data tracks of said recording element, said information written along the scanned one of said data tracks causing the polarization of said first beam to be modulated as said first beam is reflected by said recording element toward said first beam splitter, said first beam splitter further separating said first beam into a third beam which passes therethrough and a fourth beam which is reflected, said quarter-wave plate converting said third beam into a linearly polarized light beam which has a polarization that is substantially transverse to the polarization of said light beam from said laser light source;

a polarizing beam splitter provided between said laser light source and said quarter-wave plate to prevent said third beam from reaching said laser light source; and an optical signal detecting system for receiving said fourth beam from said first beam splitter so as to obtain a magnetization signal corresponding to said information along the scanned one of said data tracks.

2. The magneto-optic reading apparatus as claimed in claim 1, wherein said optical signal detecting system comprises:

a first plane mirror for reflecting an upper part of said fourth beam downward;

a second beam splitter disposed below said first plane mirror and receiving the reflected upper part of said fourth beam and a lower part of said fourth beam, said second beam splitter generating fifth and sixth beams;

an optical path incrementing means to compensate for differences in the lengths of the paths of the upper and lower parts of said fourth beam;

a first focusing lens for converging said fifth beam;

a second focusing lens for converging said sixth beam;

a first photodetector receiving the converged said fifth beam and generating a first electrical signal corresponding to the strength of the converged fifth beam;

a second photodetector receiving the converged sixth beam and generating a second electrical signal corresponding to the strength of the converged sixth beam; and a voltage summing amplifier means receiving said first and second electrical signals and generating said magnetization signal.

3. The magneto-optic reading apparatus as claimed in claim 2, further comprising a second plane mirror means for reflecting said second beam from said first beam splitter back to said first beam splitter, said first beam splitter separating said second beam into a seventh beam which passes therethrough and which combines with said fourth beam and an eighth beam which is reflected and which combines with said third beam.

* * * * *